Oct. 3, 1967 M. KUZIAK 3,345,069
ELECTRIC FINGER GUESSING GAME
Filed Jan. 7, 1965 2 Sheets-Sheet 1
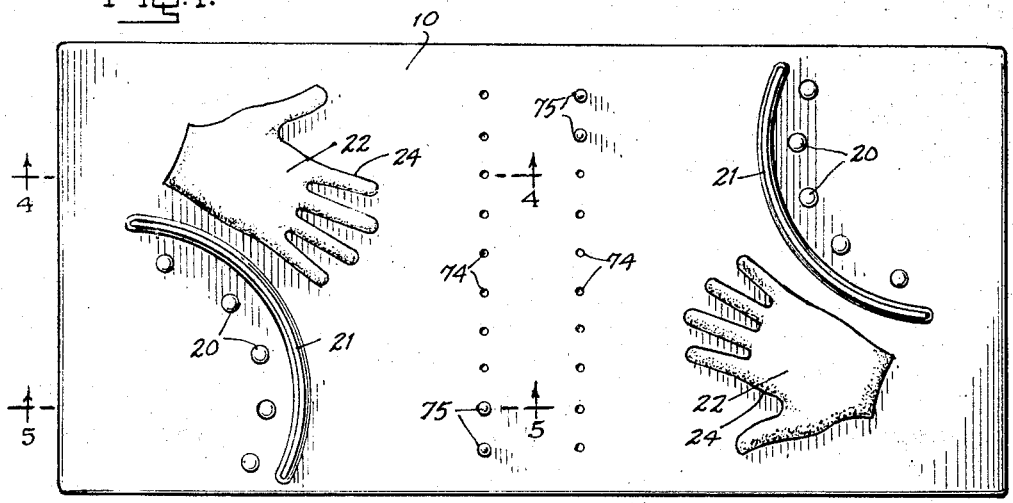
INVENTOR.
MATTHEW KUZIAK
BY
ATTORNEY.

Oct. 3, 1967    M. KUZIAK    3,345,069
ELECTRIC FINGER GUESSING GAME
Filed Jan. 7, 1965    2 Sheets-Sheet 2

INVENTOR.
MATTHEW KUZIAK
BY
ATTORNEY

United States Patent Office 3,345,069
Patented Oct. 3, 1967

3,345,069
ELECTRIC FINGER GUESSING GAME
Matthew Kuziak, Turkey Roost Road,
Monroe, Conn. 06468
Filed Jan. 7, 1965, Ser. No. 423,905
6 Claims. (Cl. 273—1)

ABSTRACT OF THE DISCLOSURE

A guessing game playing board having opposite and reversely arranged half sections for independent operation by each of two players facing each other, each half section having upon its upper side a simulated hand with the fingers outstretched toward the opponent player and each finger having an individual visual signal means, and signal actuating means arranged in correspondence to the finger tips of the simulated hand for positioning of the respective player's hand for finger tip actuation of one or more actuating means to cause instantaneous actuation of one or more of the signal means of the respective simulated hand.

---

The present invention relates to a guessing game, and has for an object to provide a mechanical game apparatus, preferably electrically operated, which simulates the well-known Italian finger game. The Italian finger game is usually participated in by two players, each of whom makes a fist of his hand so that the fingers are concealed. Thereupon one player snaps one or more fingers into view and his opponent attempts to anticipate and guess the number of fingers by simultaneously snapping one or more fingers into view. Scoring is counted in accordance with the correctness of the opponent's guess, both as to the number of fingers and the particular fingers employed. The game involves both mental and physical dexterity insofar as quick perception of the opponent's moves and coordination of sight and manual reflexes are concerned, and it is an object of the invention to provide a game apparatus wherein these same aspects of the game may be realized.

A further object is to provide a game apparatus of simple and inexpensive construction and attractive appearance, and particularly to provide highly sensive actuating means under the control of the fingers of each player arranged behind barriers to conceal the players' finger movements from each other, and further to provide simulated hand representations of the hands of the respective players including means for visibly indicating the fingers corresponding to the fingers which the players have used to operate the actuating means. In the preferred embodiment of the invention it is proposed to provide simulated hand representations formed of translucent material with each finger provided with an individual electric lamp for actuation by the corresponding fingers of the respective players. It is further proposed to provide barrier means between the fingers to confine the lighting to the individual fingers and further to provide light communicating means between the fingers and the palm of the simulated hand representation so that as each individual finger is illuminated the palm of the hand will also be illuminated to thus graphically simulate a fist with one or more fingers extended.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a top plan view of the game apparatus according to the invention;

FIG. 2 is a bottom plan view, with a part of the bottom closure panel broken away;

FIG. 3 is a side elevation;

FIG. 4 is an enlarged longitudinal sectional view of the left hand half portion of the apparatus taken along the line 4—4 of FIG. 1 and the line 4—4 of FIG. 2;

FIG. 5 is a similar longitudinal sectional view taken along the line 5—5 of FIG. 1 and the line 5—5 of FIG. 2;

FIG. 6 is a top plan view of the lamp carrying unit for disposition in relation to the simulated hand representation, shown separated from the apparatus;

FIG. 7 is a detail sectional view on a further enlarged scale taken along the line 7—7 of FIG. 6;

FIG. 8 is a detail sectional view, also on a further enlarged scale, taken along the line 8—8 of FIG. 6;

FIG. 9 is a top plan view of the switch unit for disposition in relation to the actuating buttons controlled by the fingers of the player, shown separated from the apparatus;

FIG. 10 is a detail sectional view on a further enlarged scale taken along the line 10—10 of FIG. 9; and FIG. 11 is a detail sectional view, also on a further enlarged scale, taken along the line 11—11 of FIG. 9.

Referring to the drawings, the guessing game according to the exemplary embodiment of the invention illustrated therein is embodied in a game apparatus in the form a rectangular playing board comprising a body part preferably formed of opaque molded plastic material having a top panel 10, side walls 11—11, and end walls 12—12, the lower edges of the side and end walls being inwardly recessed as at 13 to receive a bottom closure panel 14 removably secured in place by screws 15 engaged in screw holes 16 provided in enlargements 18 in the four corners 17 and enlargements 18 centrally of the side walls. A pair of spaced parallel reinforcing ribs 19—19 extend transversely between the enlargements 18.

The guessing game is adapted to be played by two players respectively positioned at the opposite ends of the game board, and identical actuating and signalling means are provided for each player. To this end the game board comprises identical half sections arranged in opposed and reverse relation to each other, and for convenience of description the structure of one half section will be described in detail and the same reference numerals will be given to the corresponding parts of the other half section.

As clearly shown in FIG. 1 five push buttons 20 are provided in arcuate spaced relation for engagement by the respective fingers of a player's hand, and are preferably disposed in the right hand portion of the board as seen from the left in FIG. 1 for convenient engagement by the fingers of the right hand of the player. In forwardly spaced relation to the push buttons there is provided an arcuate upstanding barrier wall 21 preferably integrally molded with the top panel 10 and of sufficient height to effectually conceal the player's fingers from the opponent player.

In the left hand area of the board as seen from the left in FIG. 1, there is provided a simulated hand representation 22 having the fingers extended toward the opponent player and arranged with the fingers in the same arrangement as the fingers of a player's hand engaged with the push buttons 20, i.e., with the thumb representation in the same relative position as the thumb of the right hand of the player engaged with the innermost push button and the little finger representation in the same relation as the little finger of the right hand engaged with the outermost push button.

The simulated hand is adapted to have the fingers individually illuminated and for this puropse is formed of translucent material. For the sake of better visibility to the opponent and more realistic simulation of a hand it is preferably disposed in raised relief to the top panel. As clearly shown in FIG. 4 the hand representation 22 is in the form of a molded translucent plastic piece provided with a peripheral flanged rim 23 engaged upwardly in a correspondingly shaped opening 24 in the top panel, with the flange 25 engaging the under surface of the top panel where it is secured as by cementing the contacting surfaces of the flange and panel. A downwardly extending opaque enclosure wall 26 is integrally formed with the top panel in conforming surrounding relation to the flange 25 and opens downwardly to receive in the separate finger spaces individual electric lamps to individually illuminate the fingers of the simulated hand, as will presently more fully appear. Inasmuch as the finger spaces of the enclosure wall each open at the inner end to the palm portion of the enclosure the illumination of one or more fingers will simultaneously illuminate the palm portion of simulated hand.

The five signal lamps for illuminating the individual fingers of the simulated hand 22 are carried upon a lamp unit 27, shown in detail in FIGS. 6–8. The lamp unit comprises an arcuate bar 28 of insulating material, for example Bakelite, adapted to span the finger spaces of the enclosure wall 26, provided at its upper side with a correspondingly shaped current-conducting metal strip 29 secured thereto by tubular eyelet rivets 30 suitably arranged for disposition against the planar under surface of the enclosure wall 26, where the lamp unit is secured by screws 31 engaged through the eyelet rivets and screwed into the enclosure wall. Threaded lamp sockets 32 positioned in register with the finger spaces of the enclosure wall 26 are secured at their bases by crimping or staking as at 33 within apertures 34 in the current-conducting strip 29, so that the sockets are electrically connected to the strip as a common conductor. The strip is provided at one end with an apertured conductor-wire connecting tab 35 for connection to the source of electrical energy, as will presently more fully appear. The insulating strip 28 is provided with five riveted contact members 36, each having a contact head 37 disposed within the base of a respective socket 32 in insulated spaced relation thereto, for engagement by the center contact 38 of the threaded base 39 of an electric lamp 40, and provided at its lower exposed end with a riveted-over head 41 to which a conductor wire is adapted to be soldered, as will presently more fully appear.

As seen in FIG. 5 the push buttons 20 are each engaged for sliding movement in a bearing sleeve 42 integrally formed upon the top panel 10, each button being provided at its lower end with a flange 43 to limit the upward movement of the button and provided centrally with a rounded boss 44 for respective actuating engagement with one of the five individual switches for controlling the signal lamps. As seen in FIGS. 9–11 the switches are part of a switch unit 45 adapted to be secured to the lower planar surface of an arcuate rib 46 integrally formed upon the under side of the top panel 10. The switch unit comprises an arcuate bar 47 of insulating material, for example Bakelite, provided in its upper surface with a series of radially disposed slots 48 in which are engaged a series of current-conducting spring contact strips 49 secured by rivets 50 disposed in countersunk openings 51 in the bar 47. One end portion of each strip 49 is projected in one direction as a spring contact finger 52 for engagement with the boss 44 of a respective push button, so that the push button is normally retained thereby in its upper position, while the other end portion is projected in the opposite direction in the form of an apertured conductor-wire connecting tab 53.

At the under side of the insulating bar 47 there is provided a correspondingly shaped metallic conductor strip 54 secured by rivets 55 disposed in countersunk openings 56 in the insulating bar, and provided with a series of radially projected fingers 57 having inverted V-shaped contact ends 58 disposed in opposed spaced relation to the spring contact fingers 52, the strip 54 being provided at one end with an apertured conductor-wire connecting tab 59. The switch unit is attached to the rib 46 by screws 60 engaged through holes 61 in the end portions of the bar 47 and screwed into the rib 46.

The lamps are adapted to be energized by a pair of dry batteries 62 engaged in series in a battery clip 63 secured by screws 64 to a thickened platform portion 65 integrally formed upon the under side of the top panel 10. The battery clip is of conventional form, being provided along its side edges with spring clip portions 66 for retaining the batteries, at one end with a contact leaf 67 for engagement with the negative end of one battery, and at its other end with a leaf 68 having a contact button 69 supported in an insulating bushing 70 and adapted to engage the positive end of the other battery.

As clearly seen in FIG. 2 the electric circuit comprises a series of five conductor wires 71 respectively connected between the rivet heads 41 of the lamp contacts and the wire-connecting tabs 53 of the spring fingers 52, a conductor wire 72 connected between the wire-connecting tab 35 of the conductor strip 29 of the lamp unit 27 and the contact button 69 of the battery clip, and a conductor wire 73 connected between the wire-connecting tab 59 of the conductor strip 54 of the switch unit 45 and the contact leaf 67 of the battery clip. Thus the pressure of a selected push button 20 to depress its respective spring contact finger 52 into engagement with the contact end 58 of the opposed finger 57 will close the circuit to the signal lamp 40 of a corresponding finger of the simulated hand 22, causing such finger to be illuminated.

For the purpose of convenient score-keeping the board is provided with two rows of spaced holes 74 provided in the reinforcing ribs 19—19 and opening to the top surface of the panel 10, and which are adapted to have counter pegs 75 engaged therein. These counter pegs may be of any suitable number and preferably of a different color for each of the two players.

In operation the two players sit at opposite ends of the playing board with the fingers of the right hand of each player engaged with the push buttons 20 of his half section of the playing board where any movement of the fingers will be concealed from the opponent player by the barrier 21. Upon movement of one or more fingers of either player to depress the push buttons the corresponding fingers of the hand representation 22 of each player is illuminated. In playing the game the moves followed in the well-known Italian guessing game may be employed. At the same time, the game apparatus lends itself to many variations in game procedure and scoring, either according to known methods or as devised by the players. The following are samples of several playing procedures:

(1) Guess same number of fingers each;

(2) Guess same number of fingers each plus double credit for guessing same identical fingers;

(3) Both players simultaneously call a number from 1 to 10 and at the same time press the push buttons at random. The total number of illuminated fingers are added. If one player has correctly guessed in advance the total number of illuminated fingers he will score a point. If the illuminated fingers of the other player were identical, the first player will score two points;

(4) In a challenge game one player may challenge the other alternately, or a given number of times, for example 10 times, calling out his guess of the total of both sides, and scoring double if identical fingers are illuminated by both players.

What is claimed is:

1. A guessing game apparatus comprising a game board having opposite and reversely arranged half sections for respective independent operation by each of two players facing each other, each said half section having upon its upper side a hand simulating means having a palm portion and five outstretched finger portions directed toward the other half section, five actuating means upon its upper side arranged in substantial correspondence to the finger tips of said hand simulating means for simultaneous positioning in actuating relation of the fingers of a hand of a player disposed in corresponding position to the finger portions of said hand simulating means whereby a plurality of said actuating means may be simultaneously actuated, a visual signal means disposed in relation to the respective finger portions of said hand simulating means adapted upon actuation to visually identify the respective finger portions, and means connected between said respective actuating means and the signal means of a correspondingly positioned finger portion to cause instant actuation of said respective signal means simultaneously with the finger actuation of said respective actuating means.

2. The game apparatus as defined in claim 1, further characterized by a barrier wall disposed between said hand simulating means and said actuating means for concealing the finger actuation of said actuating means from the opponent player while exposing said hand simulating means.

3. The game apparatus as defined in claim 1, wherein said hand simulating means is translucent and surrounded by an opaque part of said game board, said signal means comprises electric lamps, said actuating means comprises electric switches, and wherein an electric energy source is connected between said switches and said lamps.

4. The game apparatus as defined in claim 3, wherein said game board comprises an opaque top panel and side walls, said hand simulating means comprises a hand shaped translucent member set in a correspondingly shaped opening of said top panel, further characterized by an opaque enclosure wall at the under side of said panel defining a space substantially corresponding in shape to said opening and including finger spaces separated by opaque wall portions in which spaces said electric lamps are respectively disposed and a palm space in communication with the inner ends of said finger spaces whereby the illumination of each said finger space is transmitted to said palm space.

5. The game apparatus as defined in claim 4, further characterized in that said hand shaped translucent member comprises a top wall disposed in upwardly offset relation to said top panel and a peripheral rim disposed in said opening.

6. The game apparatus as defined in claim 4, further characterized in that said lamps are carried upon a bar member secured to the lower side of said enclosure wall and spanning said finger spaces with said lamps extending upwardly within said spaces.

References Cited

UNITED STATES PATENTS

| 2,844,374 | 7/1958 | French | 273—1 |
| 2,994,531 | 8/1961 | Eberwein | 273—1 |
| 3,022,878 | 2/1962 | Seibel. | |

FOREIGN PATENTS 941,418   11/1963   Great Britain.

ANTON O. OECHSLE, *Primary Examiner.*

F. BARRY SHAY, *Examiner.*

S. NATTER, *Assistant Examiner.*